No. 892,479. PATENTED JULY 7, 1908.
J. H. WESSON.
NUT LOCK.
APPLICATION FILED OCT. 18, 1907.
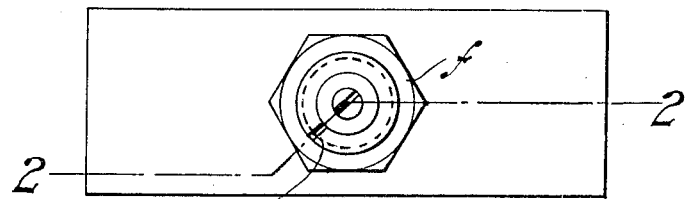
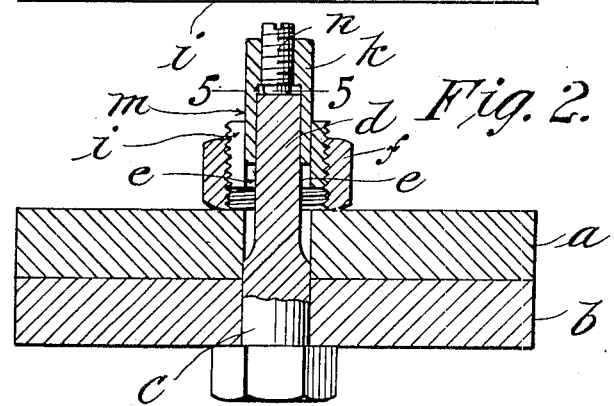
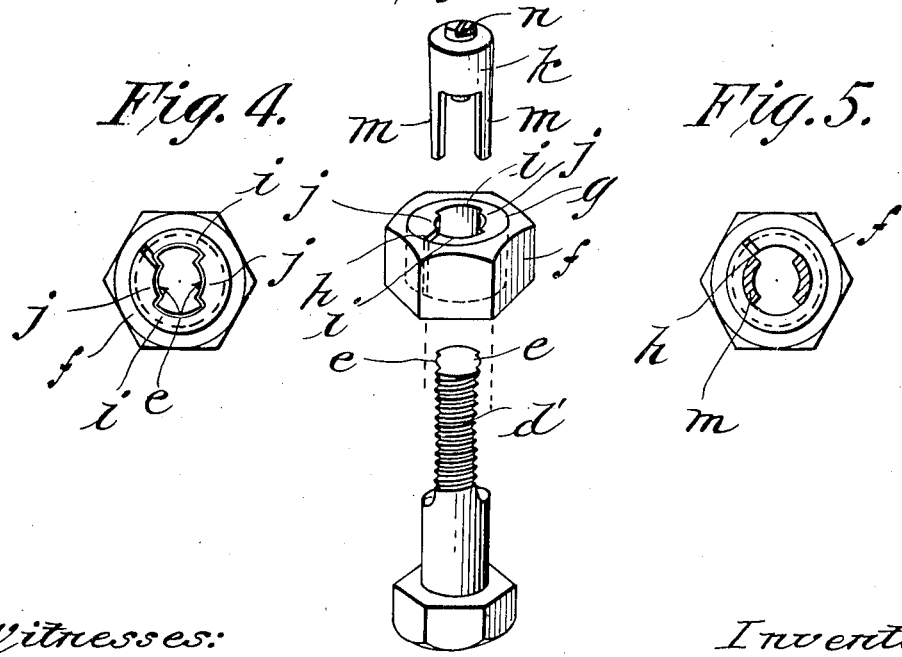
Witnesses:
H. L. Sprague
H. W. Bowen
Inventor;
Joseph H. Wesson
by Chapin & Co.
Attorneys.

UNITED STATES PATENT OFFICE.

JOSEPH H. WESSON, OF SPRINGFIELD, MASSACHUSETTS.

NUT-LOCK.

No. 892,479.  Specification of Letters Patent.  Patented July 7, 1908.

Application filed October 18, 1907. Serial No. 398,072.

*To all whom it may concern:*

Be it known that I, JOSEPH H. WESSON, a citizen of the United States of America, residing at Springfield, in the county of Hampden and State of Massachusetts, have invented new and useful Improvements in Nut-Locks, of which the following is a specification.

This invention relates to improvements in nut-locks and has for its object to provide a device that is simple in construction and one that will effectually prevent the loosening of the nut when the same is firmly rotated against an abutment; a further object of the invention is to provide a device that will permit the nut to be readily turned by the hand of the operator against the abutment, and during this operation the nut-locking means is brought into use. When the nut is in this position a slight additional rotary movement only is required to be imparted to the nut to bring it into a firm locking position against the abutment whereby the parts are securely bolted together by means of the bolt and nut; a further object is to provide a device that can be used in a space that will not permit a wrench to be conveniently used.

In the drawings forming part of this application,—Figure 1 is a plan view of the parts when in a locked position. Fig. 2 is a vertical longitudinal section of the same on the line 2—2 of Fig. 1, and Fig. 3 is a detailed perspective view of the parts before assembling. Fig. 4 is a plan view of the sleeve, bolt, and nut assembled. Fig. 5 is a horizontal sectional plan view on the line 5—5 of Fig. 4 looking down.

Referring to the drawings in detail—$a$ and $b$ designate pieces that are required to be bolted together and are shown merely for the purpose of clearly showing the operation of the device.

$c$ designates the bolt proper, the threaded shank portion $d$ of which has the threads $d^1$ cut away on opposite sides thereof, as shown at $e$ in Figs. 2 and 4, thereby producing a mutilated thread on the bolt.

$f$ designates a nut of the usual construction, and $g$ a sleeve which is slitted longitudinally thereof at $h$ and is also provided on the interior portion thereof with a mutilated or broken thread,—the mutilated portion of which is indicated at $i$, and receives the threads of the shank $d$ of the bolt when the sleeve and nut are placed thereon; when the sleeve and nut are in this position the sleeve is rotated so that the threads $d^1$ of the bolt will interlock with the threads $j$ of the sleeve $g$. The rotation of the sleeve into this position produces a sector-shaped opening between the sleeve and shank $d$, that is to say the cut-away portions of the sleeve and nut are brought into registration.

$k$ designates as a whole the locking element which is provided with the sector-shaped prongs or fingers $m$ formed integral therewith, and which are slightly tapered longitudinally so that they may be inserted into the sector-shaped openings between the sleeve and the shank portion of the bolt, as shown in Fig. 2 in sectional elevation and in plan view in Fig. 5. This locking element is provided with a screw $n$ threaded into the upper portion thereof, the purpose of which will be referred to later. After the prongs of the locking element $k$ have been inserted in place between the sleeve and bolt, the nut $f$ is rotated by hand against the abutment $a$, which movement will cause the sleeve $g$ to be advanced outwardly in the opposite direction, the sleeve and nut will be locked together by reason of the inclined surface of the prongs $m$ on the split sleeve $g$, the sleeve being also prevented from rotating by means of the prongs of the locking element $k$, as readily understood. Only a slight additional movement is now required with a wrench on the nut $f$ to firmly and securely place the nut in its final holding and locking position, which can usually be accomplished even in a very small space. The locking element $k$ having thus been firmly secured to the sleeve $g$, and this sleeve having been placed in an expanded condition by reason of the inclined surface of the prongs $m$, $m$ so as to firmly lock the threads of the nut and sleeve together, the screw $n$ is then rotated into engagement with the ends of the shank portion of the bolt, as shown in Fig. 2. The purpose of this screw is to loosen the locking element $k$ when it is desired to remove the sleeve and nut from the bolt, which operation is accomplished by turning the screw inward so that its inner end is brought to bear on the end of the bolt, whereby the locking element $k$ will be loosened from the sleeve and can then be readily withdrawn by hand after such loosening. Since the removal of this locking element permits the sleeve $g$ to contract again and remove the pressure between the nut and sleeve, the same can be rotated and the threads $j$ thereof brought into the mutilated or cut-away portion *i* of the sleeve, and when in this position, the sleeve and nut can be removed from the bolt *c*.

What I claim, is:—

1. An improvement of the class described having in combination with the mutilated threaded portion of the bolt, a nut a split sleeve provided with cut-away portions to receive the mutilated thread of the bolt, the exterior surface of the sleeve being threaded to receive the threads of the nut, and means for expanding the sleeve whereby the sleeve and nut are locked together.

2. As an improvement in nut-locks having in combination with the mutilated thread of the shank portion of the bolt, a nut a split sleeve provided with threads on its exterior surface for receiving the threads of the nut, the interior portion of the sleeve having a mutilated thread, the mutilated portion receiving the threads of the bolt, whereby when the sleeve is rotated to bring the threads of the sleeve and the threads of the bolt into engagement, an opening will be formed between the sleeve and bolt, a sector-shaped locking element for engaging the opening between the sleeve and bolt, whereby the sleeve is locked to the bolt, said sector-shaped element being tapered, whereby when the nut is rotated against an abutment the sleeve will be expanded and the threads between the sleeve and nut locked to each other.

3. As an improvement in nut-locks, in combination with the threaded portion of the shank thereof, a nut an expansive element carried by the bolt and threaded into the nut, an expanding element mounted between the expansive element and the bolt for locking the threads of the expansive element and nut together, and means carried by the expanding element for disengaging the same from the shank of the bolt.

4. A nut-locking device having in combination with the nut thereof, a split sleeve for receiving the nut, the inner portion of the sleeve being threaded to receive the threads of the bolt, and means engaging the bolt and sleeve for expanding the split sleeve, and locking the same to the nut and bolt.

JOSEPH H. WESSON.

Witnesses:
WM. H. CHAPIN,
K. I. CLEMONS.